Patented Mar. 22, 1949

2,465,061

UNITED STATES PATENT OFFICE 2,465,061

FUNGICIDAL COMPOSITION

Oliver W. Cass, Niagara Falls, N. Y., assignor to E. I. du Pont de Nemours & Company, Wilmington, Del., a corporation of Delaware No Drawing. Application September 11, 1946, Serial No. 696,349

6 Claims. (Cl. 167—30)

This invention relates to the production of new chemical compounds; more particularly, it relates to the production of chemical compounds having the formula $$RO-CH_2-CH=CH-CH_2Cl$$

in which R designates phenyl or chlorinated phenyl.

It is primarily an object of this invention to produce the new class of chemical compounds above-identified.

It is another object of this invention to produce a fungicidal composition comprising, as the fungicidal agent, a chemical compound having the formula $$RO-CH_2-CH=CH-CH_2Cl$$

in which R designates phenyl or chlorinated phenyl.

Other objects of the invention will appear hereinafter.

The objects of this invention may be accomplished, in general, by reacting 1,4-dichlorbutene-2 with sodium phenoxide or a sodium chlorophenoxide. The sodium chlorophenoxide may contain from one to five chlorine atoms, i. e., it may be mono-, di-, tri-, tetra-, or penta-chlor sodium phenoxide.

The reaction is preferably carried out in the presence of an inert solvent, for example, methanol, ethanol, methyl or ethyl ether of ethylene glycol, benzene, toluene, or xylene. The sodium phenoxide or sodium chlorophenoxide may be added as such or it may be formed, in situ, in the solvent by the addition of sodium hydroxide to phenol or the desired chlorinated phenol.

The reaction may be carried out at atmospheric temperature and pressure, i. e., at about 25° C. and 760 mm. Hg, or it may be carried out at an elevated temperature, for example, at the boiling point of the reaction mixture at atmospheric pressure or above atmospheric pressure, with or without reflux. The reactants may also be reacted directly without the use of a solvent; however, the use of a solvent is greatly to be preferred.

The following example is given to illustrate, in detail, a preferred method of reacting 1,4-dichlorobutene-2 and sodium phenoxide formed, in situ, by the addition of an alcohol solution of phenol and sodium hydroxide. It is to be understood that sodium chlorophenoxide containing from one to five chlorine atoms on the phenol nucleus can be likewise formed, in situ, by the addition of sodium hydroxide to the desired chlorophenol, and the resulting sodium chlorophenoxide reacted with the 1,4-dichlorobutene-2.

EXAMPLE

The reactor consisted of a one-liter flask equipped with a stirrer, reflux condenser, dropping funnel and thermometer. Sixty-two and one-half (62.5) grams (0.5 mole) of 1,4-dichlorobutene-2 and 200 cc. ethanol were placed in the reactor and the stirrer started. To this was slowly added a solution prepared by adding 47 grams (0.5 mole) of phenol and 20 grams (0.5 mole) sodium hydroxide to 400 cc. of ethanol and stirring until complete solution resulted. A very gentle exothermic reaction took place (temperature rose 5° during the addition period of thirty minutes). The reaction mixture was then heated to reflux temperature (79.5° C.) for three hours at which time a test sample showed the reaction to be 99% complete. The reaction mixture was then diluted with three volumes of water and the oily material separated. On cooling and filtering, 33 grams of by-product solid 1,4-diphenoxybutene-2 was obtained. The oily filtrate was distilled, giving a 16 gram fraction, B. P. 143°–146° C. at 10 mm. This fraction was determined to be 1-phenoxy-4-chlorobutene-2 and was a colorless liquid with a spicy, somewhat phenolic odor. It had the following physical constants: $d_4^{20}=1.124$; $n_D^{20}=1.5354$; molecular refraction 50.57 (calculated 50.82%).

The new chemical compounds of the present invention having the formula $$RO-CH_2-CH=CH-CH_2Cl$$

in which R designates phenyl or chlorinated phenyl may be incorporated in a fungicidal composition as the fungicidal agent. The fungicidal composition containing the above-said fungicidal agent may be placed adjacent to an article subject to fungi growth to inhibit or destroy said growth. The said phenoxy or chlorophenoxy chlorobutenes of the present invention have sufficient volatility to surround the article to be protected with a gaseous atmosphere which will prevent or inhibit fungi growth.

Fungicidal compositions containing the phenoxy or chlorophenoxy chlorobutenes of the present invention may be prepared by admixing the same with an inert carrier which may be either a liquid or a solid, depending upon how the fungicidal composition is to be used. The composition may be prepared with a liquid carrier by dissolving or forming a finely divided dispersion thereof in an inert liquid, for example, water, methyl, ethyl or propyl alcohol, hydrocarbon solvent, or the like. Such liquid, fungicidal composition may be coated on the surface of the article to be protected against fungi growth. Alternatively, the fungicidal composition may be prepared with a solid carrier by admixing the said phenoxy or chlorophenoxy chlorobutenes with a finely divided, inert, solid material, for example, charcoal, silica gel, clay, fuller's earth, or the like. Such dry, solid, fungicidal composition may be placed in a box or package with the article to be protected. If desired, the finely divided, dry fungicidal composition may be pelleted and used in that form. The quantity of carrier, whether liquid or solid, which is added to the fungicidal agent can be varied between wide limits, depending upon the strength of fungicide desired in the composition. The carrier may, therefore, comprise between 5% and 90% of the ultimate composition.

The fungicidal compositions of the present invention were tested to determine the fungicidal value thereof in the following manner. Six fungi were used to evaluate all compounds tested:

Monilia (Crassa)
*Aspergillus niger*
Penicillium sp.
Spicaria sp.
Rhizopus sp.
*Glicocladium fimbriatum*

These fungi were grown on a solid, nutrient agar containing 10 grams of glucose, 5.0 grams of peptone, 0.5 gram of magnesium sulfate, 1.0 gram of mono-potassium sulfate, 15 grams of agar, and 1000 cc. of water.

Petri dishes were used for the test, the top and bottom sections sealed at their edges to form a growth chamber. The composition under test as a fungicide was placed in a glass cup 8 mm. in diameter and 5 mm. high, cemented to the center of the lower half of the Petri dish. After sterilization of the dishes, 10 cc. of molten, sterile agar was poured into the top half of the growth chamber. After the agar solidified, spores of the six fungi were transferred onto six individual positions on the agar surface. One-tenth (0.1) gram of the fungical composition being tested was placed in the cup, the section containing the inoculated agar placed on top, and the chamber sealed with an adhesive tape. The chambers were incubated for five days at 30° C. Degree of growth was determined each day by comparison with two or more control chambers containing no fungicide.

After five days, the fungi not showing a definite growth were transferred to agar slants of the same composition by removing agar at the point of inoculation and spreading it over the slant. If growth occurred on the slant, it indicated that the material under test was completely fungistatic under the conditions used, but not fungicidal for the species.

The 1-(2,4,6-trichloro)phenoxy-4-chlorobutene-2, despite its low vapor pressure, was found to be 75% fungicidal; however, 1-phenoxy-4-chlorobutene-2 was found to be 100% fungicidal. The latter compound was subjected to a dilution test conducted as follows: The tests were conducted in five- to six-liter bell jars resting on glass squares to which they were sealed by a thin layer of lubricant. The material to be tested was run onto four small, rectangular pieces of filter paper. The paper rectangles were held equally spaced around the inside, about half way up the jar, by a circle of adhesive tape. The fungi were inoculated onto agar in half of a Petri dish, the same as in the preceding test and the dish set under the bell jar on the glass plate.

Tests were made with enough of the 1-phenoxy-4-chlorobutene to give a vapor concentration of 1:20,000 and 1:60,000. The results of these fungicidal tests are given in the following table.

Table

|  | V. P. at 30°C. | Screening Tests | Dilution Tests | |
| --- | --- | --- | --- | --- |
|  |  |  | 1/20,000 | 1/60,000 |
|  |  | Per cent | Per cent | Per cent |
| 1-phenoxy-4-chlorobutene-2 | 0.03 | 100 | 100 | 100 |
| 1-(2,4,6-trichloro) phenoxy-4-chlorobutene-2 | 0.01 | 75 | | |

The six species of fungi tests are representative of fungi most generally encountered in the handling and shipment of goods. It has, furthermore, been established that materials which are fungicidal to the above-said six fungi are fungicidal to fungi in general.

The fungicides of the present invention may be, if desired, combined with other known fungicidal agents, for example, paraformaldehyde, camphor, p-dichlorobenzene, naphthalene, and the like.

Reference in the specification and claims to parts, proportions and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. A fungicidal composition comprising as a fungicidal agent a compound represented by the formula $$RO-CH_2-CH=CH-CH_2Cl$$

in which R is a radical taken from the group consisting of phenyl and chlorinated phenyl and containing, as a carrier, an inert material.

2. A fungicidal composition comprising as a fungicidal agent a compound represented by the formula $$RO-CH_2-CH=CH-CH_2Cl$$

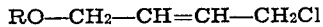

in which R is a radical taken from the group consisting of phenyl and chlorinated phenyl and containing, as a carrier, an inert liquid.

3. A fungicidal composition comprising as a fungicidal agent a compound represented by the formula $$RO-CH_2-CH=CH-CH_2Cl$$

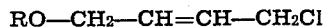

in which R is a radical taken from the group consisting of phenyl and chlorinated phenyl and containing, as a carrier, a finely divided solid.

4. A fungicidal composition comprising as a fungicidal agent a compound represented by the formula $$RO-CH_2-CH=CH-CH_2Cl$$

in which R is a radical taken from the group consisting of phenyl and chlorinated phenyl and containing, as a carrier, a finely divided solid, said fungicidal agent and said finely divided solid being compressed into a pellet.

5. A fungicidal composition comprising as a fungicidal agent 1-phenoxy-4-chlorobutene-2 and containing, as a carrier, an inert material.

6. A fungicidal composition comprising as a fungicidal agent 1-(2,4,6-trichloro)phenoxy-4-chlorobutene-2 and containing, as a carrier, an inert material.

OLIVER W. CASS.

REFERENCES CITED

The following references are of record in the file of this patent:

UNITED STATES PATENTS

| Number | Name | Date |
|---|---|---|
| 2,057,044 | Meisenburg | Oct. 13, 1936 |
| 2,205,395 | Coleman (1) | June 25, 1940 |
| 2,207,721 | Coleman (2) | July 16, 1940 |
| 2,312,801 | Craig | Mar. 2, 1943 |
| 2,335,384 | Bousquet | Nov. 30, 1943 |

OTHER REFERENCES

Hurd et al., Jour. Amer. Chem. Soc., vol. 58 (1936), pages 2190-2193.